Feb. 19, 1924.

G. E. R. ROTHENBUCHER 1,484,238

REVERSIBLE PUMP VALVE

Filed May 21, 1921

Inventor:
George E. R. Rothenbucher.

By

Attorneys

Patented Feb. 19, 1924.

1,484,238

UNITED STATES PATENT OFFICE.

GEORGE E. R. ROTHENBUCHER, OF CHICAGO, ILLINOIS.

REVERSIBLE PUMP VALVE.

Application filed May 21, 1921. Serial No. 471,355.

*To all whom it may concern:*

Be it known that I, GEORGE E. R. ROTHENBUCHER, a citizen of the United States, residing at Chicago, in the county of Cook and State of Illinois, have invented new and useful Improvements in Reversible Pump Valves, of which the following is a specification.

This invention relates to valves employed in connection with pumps for controlling the inlet and the outlet flow of the fluid operated on by the pump, and its object is to provide in a valve of this kind a novel and improved construction which assures a proper seating at all times, and also to provide a valve facing which can be reversed when one side is worn to obtain a new wearing surface for another period of use.

The objects stated are attained by means of a combination and arrangement of parts to be hereinafter described and claimed, and in order that the same may be better understood, reference is had to the accompanying drawing forming a part of this specification.

Figure 1:
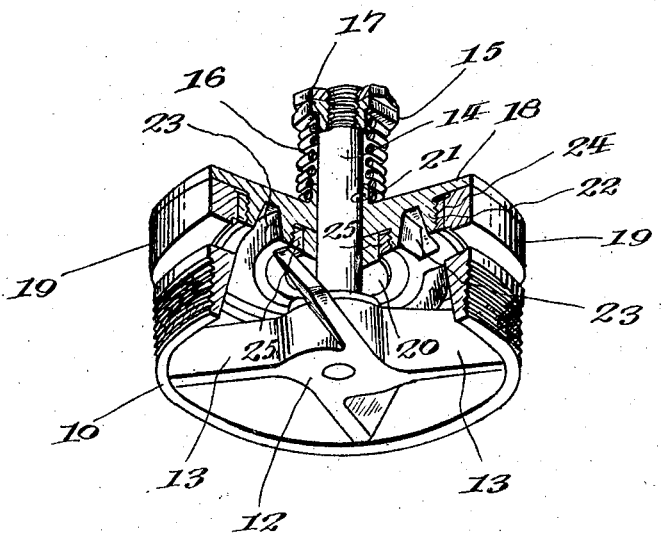
Figure 1 is a perspective view of the valve, partly broken away.
Figure 2:
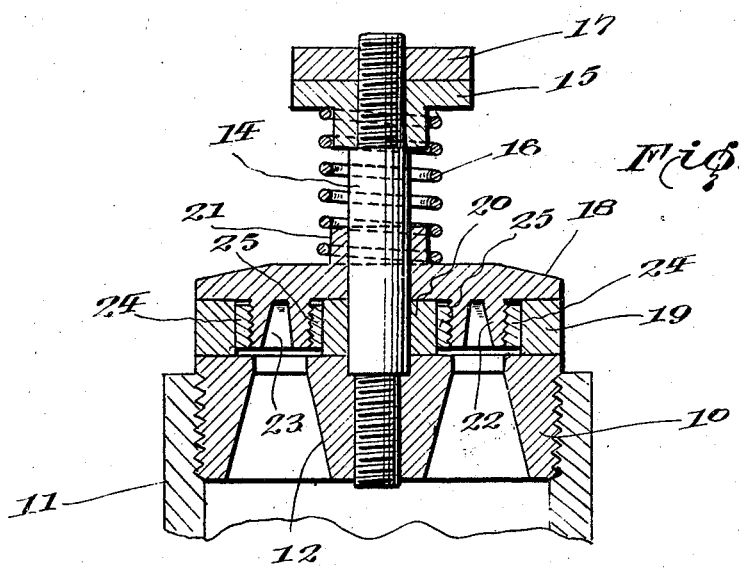
Fig. 2 is a central vertical section.

Referring specifically to the drawing, 10 denotes an annular member which serves as the seat and the support of the valve proper. This member is mounted in an opening in the wall of the pump valve chamber 11, and it is shown externally screw-threaded to screw into said opening. It will be understood however that the seat member may be made without threads and secured in the valve chamber wall in any approved manner.

The seat member 10 has a central hub 12 from which radiate fluid-deflecting wings 13, said wings extending across the space between the hub and the inner surface of the seat member. The wings are set obliquely to the direction of the fluid flow through the seat member, whereby the fluid is deflected laterally for a purpose to be presently described.

The hub 12 carries a stem 14 on which is slidably mounted the valve proper.

The lower end of the stem is reduced and threaded to screw into the hub, and its upper end is also reduced and screw threaded to receive an abutment 15 for the upper end of a valve-closing spring 16, and a lock nut 17 for said abutment.

The valve proper is a disk 18 fitted, on its side which faces the seat member 10, with facing rings 19 and 20 which are concentrically arranged and so dimensioned that the ring 19 seats on the member 10 and the ring 20 on the hub 12 when the valve is closed. The disk 18 has a central opening through which the stem 14 passes, and the spring 16 bears against the back of the disk, the center thereof having a boss 21 over which the spring is centered.

The under side of the disk 18, or that side which faces the seat member 10, has an annular rib 22 in the bottom of which are fluid pockets 23, said pockets registering with the space between the hub 12 and the inner surface of the seat member 10.

The rib 22 is threaded externally and internally for carrying supporting members for the facing rings 19 and 20. The supporting member for the outer ring 19 is a ring 24 which is internally threaded to screw on the outer threads of the rib 22, and the supporting member of the inner ring 20 is an externally threaded ring 25 which is screwed on the inner threads of the rib 22. The facing rings are tightly fitted to their supporting rings. The purpose of the separate supporting rings is to permit the use of a metal or other valve facing material in which it is not practical to cut screw threads for direct attachment to the valve body. It will also be noted that the supporting rings are shorter than the facing rings, so that the latter project beyond the plane of the ends of the former. This is done for the purpose of permitting reversal of the facing rings when one side wears down to the supporting rings. Thus, when the active sides of the facing rings wear away so that the valve leaks, a reversal of the rings is all that is necessary to obtain a new wearing surface for another period of use, and when this surface has worn away, the valve can still be used after fitting the same with new facing rings.

When the valve is in operation the fluid passing through the seat member 10 is deflected laterally into the pockets 23 by the wings 13, with the result that the valve is given a rotary movement as it rises off its seat against the tension of the spring 16. This rotary motion of the valve prevents the same from seating in the same place, and also prevents hammering and pounding and assures a perfect seating at all times. The threads on the rings 24 and 25 run in such a direction that the rotary motion of the valve has a tendency to tighten said rings, and the same is true with respect to the stem 14, so that there are no parts to get loose. The spring 16 also serves to prevent the valve from rotating too far when it rises off its seat.

I claim:

1. A valve comprising a disk having an annular rib on one side which is threaded on both sides, facing rings on said side of the disk, and securing rings for carrying said facing rings, one of said securing rings being threaded internally to screw on the outside of the rib, and the other ring threaded externally to screw on the inside of the rib.

2. A valve comprising a disk having an annular rib on one side which is threaded on both sides, facing rings on said side of the disk, and securing rings carrying said facing rings, one of said securing rings being threaded internally to screw on the outside of the rib, and the other ring threaded externally to screw on the inside of the rib, the length of the facing rings being greater than that of the securing rings to leave the ends of the former projecting beyond the plane of the ends of the latter.

3. A valve comprising a disk having an annular rib on one side, a facing ring on said side of the disk, and a ring carrying said facing ring and detachably and reversibly secured to the rib, the length of the facing ring being greater than that of the second mentioned ring to leave the ends of the former projecting beyond the plane of the ends of the latter.

4. A valve structure comprising an annular seat having a central hub, a stem carried by the hub, and a valve slidably mounted on said stem, said valve consisting of a disk having an annular rib on its side which faces the seat and the hub, said rib being screw-threaded externally and internally, rings screwed on said threaded portions of the rib, and facing rings carried by said rings and positioned to engage the aforesaid seat and the hub respectively.

In testimony whereof I affix my signature.

GEORGE E. R. ROTHENBUCHER.